(12) United States Patent
Taniguchi et al.

(10) Patent No.: US 11,455,389 B2
(45) Date of Patent: Sep. 27, 2022

(54) EVALUATION METHOD, INFORMATION PROCESSING APPARATUS, AND STORAGE MEDIUM

(71) Applicant: FUJITSU LIMITED, Kawasaki (JP)

(72) Inventors: Tsuyoshi Taniguchi, Katsushika (JP); Ryusuke Masuoka, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 355 days.

(21) Appl. No.: 16/672,016

(22) Filed: Nov. 1, 2019

(65) Prior Publication Data
US 2020/0065482 A1    Feb. 27, 2020

Related U.S. Application Data

(63) Continuation of application No. PCT/JP2018/012692, filed on Mar. 28, 2018.

(30) Foreign Application Priority Data

May 19, 2017    (JP) .............................. JP2017-100104

(51) Int. Cl.
*G06F 21/55*    (2013.01)
(52) U.S. Cl.
CPC ...... *G06F 21/552* (2013.01); *G06F 2221/031* (2013.01); *G06F 2221/034* (2013.01)
(58) Field of Classification Search
CPC ...... G06F 21/55; G06F 21/552; G06F 21/577; H04L 63/14–1466; H04L 2463/141–146
See application file for complete search history.

(56) References Cited

U.S. PATENT DOCUMENTS

| 9,686,308 | B1* | 6/2017 | Srivastava | G06Q 10/107 |
| 10,284,587 | B1* | 5/2019 | Schlatter | H04L 63/1425 |
| 10,341,377 | B1* | 7/2019 | Dell'Amico | H04L 63/1433 |
| 2008/0083034 | A1* | 4/2008 | Kim | H04L 63/1433 |
| | | | | 726/25 |

(Continued)

FOREIGN PATENT DOCUMENTS

| JP | 2001-155020 A | 6/2001 |
| JP | 2005-128946 A | 5/2005 |

(Continued)

OTHER PUBLICATIONS

JPOA—Office Action of Japanese Patent Application No. 2017-100104 dated Feb. 9, 2021, with Machine Translation.
ManageEngine Firewall Analyzer User Guide, 2014 (accessed on Oct. 11, 2021 from https://www.manageengine.com). **cited in Examination Report dated Oct. 13, 2021 for corresponding United Kingdom Patent Application No. 1915481.4.

(Continued)

*Primary Examiner* — Minh Dinh
(74) *Attorney, Agent, or Firm* — Fujitsu Patent Center (57) ABSTRACT

A non-transitory computer-readable storage medium storing a program that cause a processor included in an information processing apparatus to execute a process, the process includes collecting a plurality of types of cyberattack information; evaluating a number of types of cyberattacks in which feature information of the cyberattack appears based on the collected cyberattack information; and when receiving specification of the feature information of a cyberattack, responding evaluation results of the number of types of cyberattacks in which the specified feature information of the cyberattack appears.

14 Claims, 12 Drawing Sheets

(56) References Cited

U.S. PATENT DOCUMENTS

| | | | |
|---|---|---|---|
| 2014/0007238 A1* | 1/2014 | Magee | G06F 21/577 726/24 |
| 2016/0226904 A1* | 8/2016 | Bartos | G06F 21/566 |
| 2016/0248788 A1 | 8/2016 | Saito et al. | |
| 2017/0006054 A1 | 1/2017 | Stiansen | |
| 2018/0324197 A1* | 11/2018 | Zettel, II | H04L 43/062 |

FOREIGN PATENT DOCUMENTS

| | | |
|---|---|---|
| JP | 2007-208861 A | 8/2007 |
| JP | 2009-81736 | 4/2009 |
| JP | 2010-086311 A | 4/2010 |
| JP | 2015-216549 A | 12/2015 |
| JP | 2016-152594 A | 8/2016 |

OTHER PUBLICATIONS

Examination Report of United Kingdom Patent Application No. 1915481.4 dated Oct. 13, 2021.
Suzuki, Shogo et al.,"Analysis on Local Characteristics of Cyber Attacks from International Darknet Monitoring", Proceedings of 2014 Computer Security Symposium CSS2014, Research on Malware Countermeasures of 2014 Joint Meeting of Human Resource Development Workshop, Symposium Series of Information Processing Society of Japan, Oct. 22-24, 2014, pp. 40-47, with English Abstract.
International Search Report and Written Opinion of the International Searching Authority, with Partial Translation (Form PCT/ISA/210, 220, and 237), mailed in connection with PCT/JP2018/012692 and dated Jul. 3, 2018. (12 pages).

* cited by examiner

```
<stix:STIX_Package ...>
<stix:STIX_Header>
...
</stix:STIX_Header>
<stix:Observables...>
...
<cybox:Title> DESCRIBE TITLE OF OBSERVABLE </cybox:Title>
...
<AddressObj:Address_Value> DESCRIBE VALUE OF OBSERVABLE </AddressObj:Address_Value>     ← 11a
...
</stix:Observables>
<stix:Indicators>
...
<indicator:Title> DESCRIBE TITLE OF indicator </indicator:Title>     ← 11b
...
</stix:Indicators>
<stix:STIX_TTPs>
...
<ttp:Title> DESCRIBE TITLE OF TTP </ttp:Title>     ← 11c
...
</stix:STIX_TTPs>
<stix:Exploit_Targets>
...
<et:Title> DESCRIBE TITLE OF Exploit Target </et:Title>     ← 11d
...
</stix:Exploit_Targets>
<stix:Campaigns>
...
<campaign:Title> DESCRIBE TITLE OF campaign </campaign:Title>     ← 11e
...
</stix:Campaigns>
...
<stix:Threat_Actors>
...
<ta:Title> DESCRIBE TITLE OF Threat Actor </ta:Title>     ← 11f
...
</stix:Threat_Actors>
</stix:STIX_Package >
```

```
<stix:STIX_Package ...>
<stix:STIX_Header>
...
</stix:STIX_Header>
<stix:Observables...>
...
<cybox:Title> IP addresses </cybox:Title>
...
<AddressObj:Address_Value>XXX.XXX.XXX.XXX</AddressObj:Address_Value>
...
<cybox:Title>Cerber IP addresses </cybox:Title>
...
<AddressObj:Address_Value>YYY.YYY.YYY.YYY</AddressObj:Address_Value>
...
</stix:Observables>
<stix:STIX_TTPs>
...
<ttp:Title> ... </ttp:Title>
...
</stix:STIX_TTPs>
<stix:Campaigns>
...
  <campaign:Title> Campaign1 </campaign:Title>
...
</stix:Campaigns>
...
```

| COMBINATION OF ELEMENTS | SUBGROUP | WEIGHT |
|---|---|---|
| IP1 & IP2 | Campaign 1 | 1.0 |
| ... | ... | ... |
| Domain 1 | Malware 1 | 0.5 |
| | Malware 2 | 0.4 |
| | ... | ... |
| ... | ... | ... |
| | | |

EVALUATION METHOD, INFORMATION PROCESSING APPARATUS, AND STORAGE MEDIUM

CROSS-REFERENCE TO RELATED APPLICATION

This application is a continuation application of International Application PCT/JP2018/012692, filed on Mar. 28, 2018 and designated the U.S., the entire contents of which are incorporated herein by reference. The International Application PCT/JP2018/012692 is based upon and claims the benefit of priority of the prior Japanese Patent Application No. 2017-100104, filed on May 19, 2017, the entire contents of which are incorporated herein by reference.

FIELD

An embodiment of the present invention relates to an evaluation program, an evaluation method, and an information processing apparatus.

BACKGROUND

In recent years, cyberattacks such as unauthorized access via a network have become a serious problem. Regarding the cyberattack, a related art has been known that acquires an access history to a communication device to be monitored and determines a network attack based on the acquired access history.

Furthermore, an attacker who makes cyberattacks targets a target and makes more sophisticated attacks. Unless information on cyberattacks on other organizations is shared and preparation for a new attack is made, it is difficult to respond to the sophisticated cyberattacks. Information summarized in a report and the like including not only alerts that are automatically issued by a sensor and the like regarding an attacker, an object, an attack method and trick, and the like regarding the cyberattack but also analysis by an analyst is referred to as a cyber threat intelligence. Standardization and construction of a platform to share the cyber threat intelligence have been progressed, and a foundation for using a large amount of cyber threat intelligences has been established.

Patent Document 1: Japanese Laid-open Patent Publication No. 2016-152594

Patent Document 2: Japanese Laid-open Patent Publication No. 2005-128946

Patent Document 3: Japanese Laid-open Patent Publication No. 2007-208861

Patent Document 4: Japanese Laid-open Patent Publication No. 2001-155020

However, to analyze the cyberattack from the cyber threat intelligence so as to respond to the more sophisticated cyberattack is not easy. For example, by simply looking at one cyber threat intelligence, it is difficult to distinguish whether or not an event observed in the cyberattack is an observable that is used in a commonly used method. Furthermore, since the cyberattacks are made every day and are evolved, it is not easy for a person to read and analyze the large number of cyber threat intelligences. In consideration of such circumstances, it is desirable to be capable of providing an evaluation program, an evaluation method, and an information processing apparatus capable of easily analyzing a cyberattack.

SUMMARY

According to an aspect of the embodiments, a non-transitory computer-readable storage medium storing a program that cause a processor included in an information processing apparatus to execute a process, the process includes collecting a plurality of types of cyberattack information; evaluating a number of types of cyberattacks in which feature information of the cyberattack appears based on the collected cyberattack information; and when receiving specification of the feature information of a cyberattack, responding evaluation results of the number of types of cyberattacks in which the specified feature information of the cyberattack appears.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter, an evaluation program, an evaluation method, and an information processing apparatus according to an embodiment will be described with reference to the drawings. The configurations having the same function in the embodiment are denoted with the same reference sign, and the redundant description will be omitted. Note that the evaluation program, the evaluation method, and the information processing apparatus described in the following embodiment are merely examples and do not limit the embodiment. In addition, each embodiment below may be appropriately combined within the scope of no contradiction.

Figure 1:
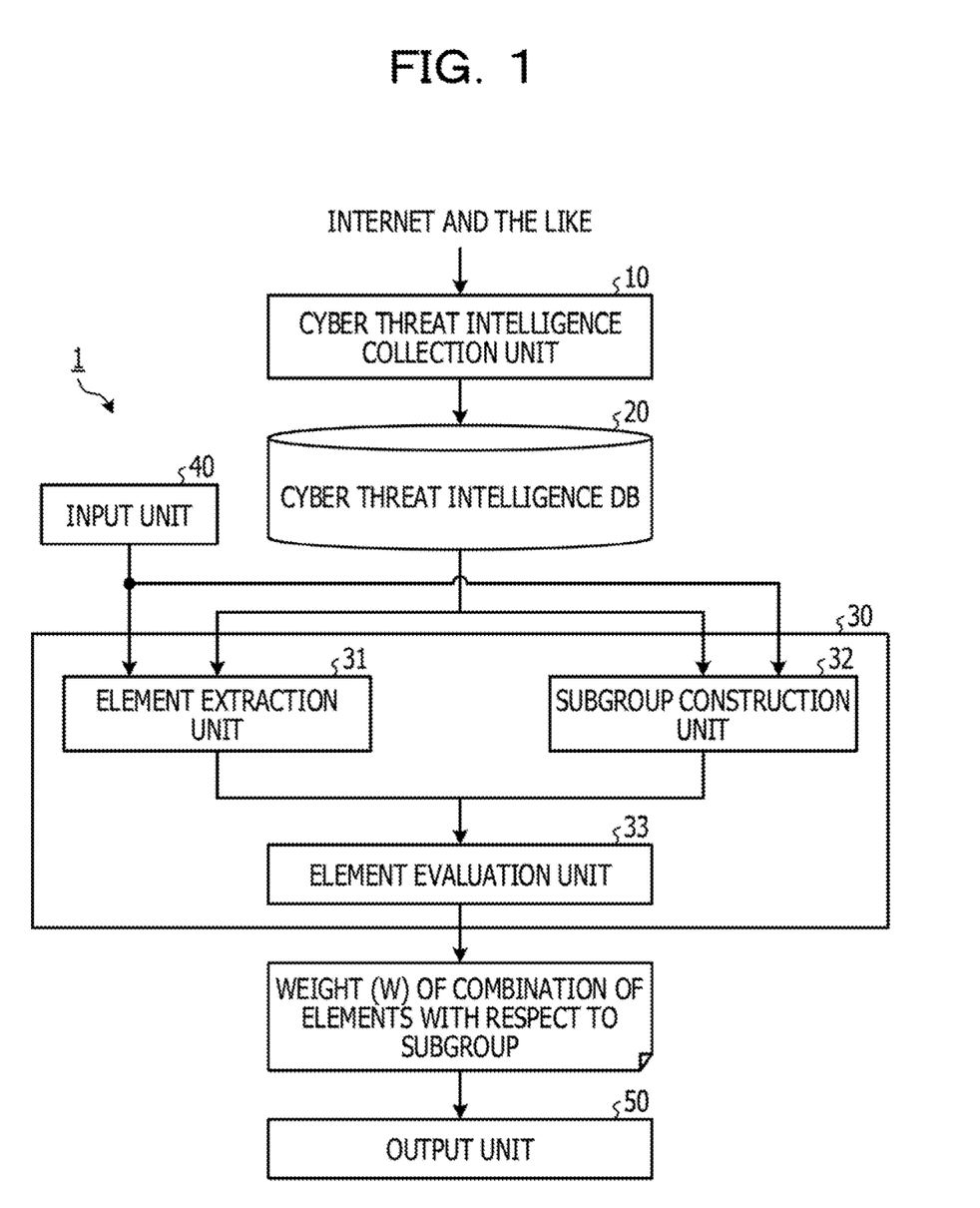
FIG. 1 is a block diagram illustrating an exemplary functional configuration of an information processing apparatus according to an embodiment.

FIG. 1 is a block diagram of an exemplary functional configuration of the information processing apparatus according to the embodiment. An information processing apparatus 1 according to the embodiment is, for example, a computer such as a personal computer (PC). As illustrated in FIG. 1, the information processing apparatus 1 includes a cyber threat intelligence collection unit 10, a cyber threat intelligence DB 20, an evaluation unit 30, an input unit 40, and an output unit 50.

The cyber threat intelligence collection unit 10 collects various cyber threat intelligences provided by analysts and the like via the Internet and the like and stores the collected cyber threat intelligence in the cyber threat intelligence DB 20. The cyber threat intelligence DB 20 is a database that stores the cyber threat intelligences collected by the cyber threat intelligence collection unit 10.

For example, the cyber threat intelligence collection unit 10 collects various cyber threat intelligences by crawling preset sites on the Internet. Next, the cyber threat intelligence collection unit 10 stores the collected cyber threat intelligence in the cyber threat intelligence DB 20 as adding additional information such as identification information (for example, ID) and a collected time for each cyber threat intelligence.

Figure 2:
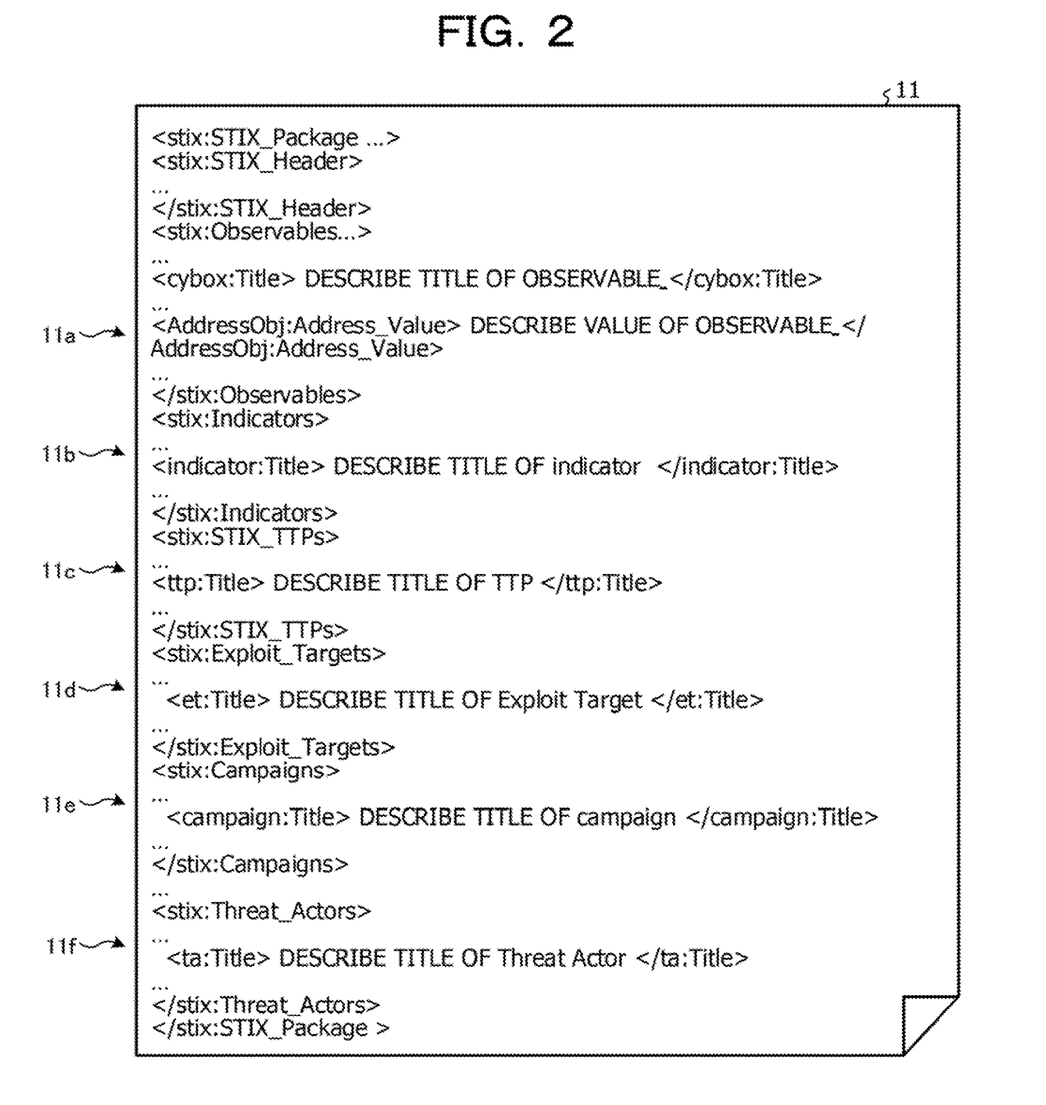
FIG. 2 is an explanatory diagram for explaining a cyber threat intelligence.

FIG. 2 is an explanatory diagram for explaining the cyber threat intelligence. As illustrated in FIG. 2, in a cyber threat intelligence 11, information on cyberattacks is described in a format such as the Structured Threat Information eXpression (STIX) and the like. For example, the STIX includes eight information groups including cyberattack activities (Campaigns), attackers (Threat_Actors), attack ways (TTPs), detection indicators (Indicators), observables (Observables), incidents (Incidents), counter measures (Courses_Of_Action), and attack targets (Exploit_Targets).

That is, the cyber threat intelligence 11 is an example of cyberattack information. Furthermore, at the time of STIX version 1.1.1, the cyber threat intelligence 11 is described in an eXtensible Markup Language (XML) format as illustrated in FIG. 2.

For example, in an area 11a sandwiched by tags of "Observables", an observed IP and a hash value of domain malware are described. In an area 11b sandwiched by tags of "Indicators", information indicating an index that characterizes a cyberattack event is individually described. Specifically, in the area 11b, an index that characterizes the cyberattack is described together with a tool used to create a detection indicator from a type of the detection indicator, an observable related to the detection indicator, an attack stage phase, a trace, and the like.

Furthermore, in an area 11c sandwiched by tags of "TTPs", an attack method that is used, for example, spam mail, malware, a watering hole attack, and the like is described. Furthermore, in an area 11d sandwiched by tags of "Exploit_Targets", information indicating a weak point of an asset to be a target of an attack in a cyberattack event such as weak points of software and a system to be attacked, from a viewpoint of vulnerability, the type of vulnerability, settings, configurations, and the like is individually described.

Furthermore, in an area 11e sandwiched by tags of "Campaigns", a name of a series of attacks and the like are described. That is, in the area 11e, information regarding the type of the cyberattack is described.

Furthermore, in an area 11f sandwiched by tags of "Threat_Actors", information regarding a person/organization for contributing to the cyberattack is individually described from viewpoints of a type of the attacker of the cyberattack, synchronization of the attacker, a skill of the attacker, an intention of the attacker, and the like. Specifically, in the area 11f, an IP address of an unauthorized access source (transmission source), a mail address, or information regarding an account of a social network service is described.

In this way, in the areas 11a to 11f of the cyber threat intelligence 11, information indicating the feature of the cyberattack such as the observables (IP, domain, hash value, and the like), the TTP, and the like of the cyberattack, that is, feature information of the cyberattack is described. Note that, as a source used to share the cyber threat intelligence 11, there are Open Threat Exchange (OTX) that is provided by AlienVault and can be used for free, iSIGHT Partners provided by FireEye, and the like. In addition, if a platform that is available to the public was used, it is possible to confirm the content of the cyber threat intelligence 11 and see a relationship between the cyber threat intelligences 11.

The evaluation unit 30 includes an element extraction unit 31, a subgroup construction unit 32, and an element evaluation unit 33. The evaluation unit 30 refers to the cyber threat intelligence DB 20 and evaluates the number of types of the cyberattacks (campaign and malware) in which the element appears regarding each element indicating the feature of the cyberattack such as the observable (IP, domain, hash value, and the like), the TTP, and the like of the cyberattack.

Specifically, when receiving specification of an element by a user input from the input unit 40, the evaluation unit 30 outputs the evaluation results regarding the number of types of the cyberattacks in which the specified element appears to the output unit 50. As an example, the evaluation unit 30 outputs a weight (W) of a combination of the elements with respect to the subgroup, that is, a weight value W according to the number of appeared elements (heavier as number of appeared elements increases) for each subgroup indicating the type of the cyberattack such as the campaign, the malware, and the like.

Figure 3:
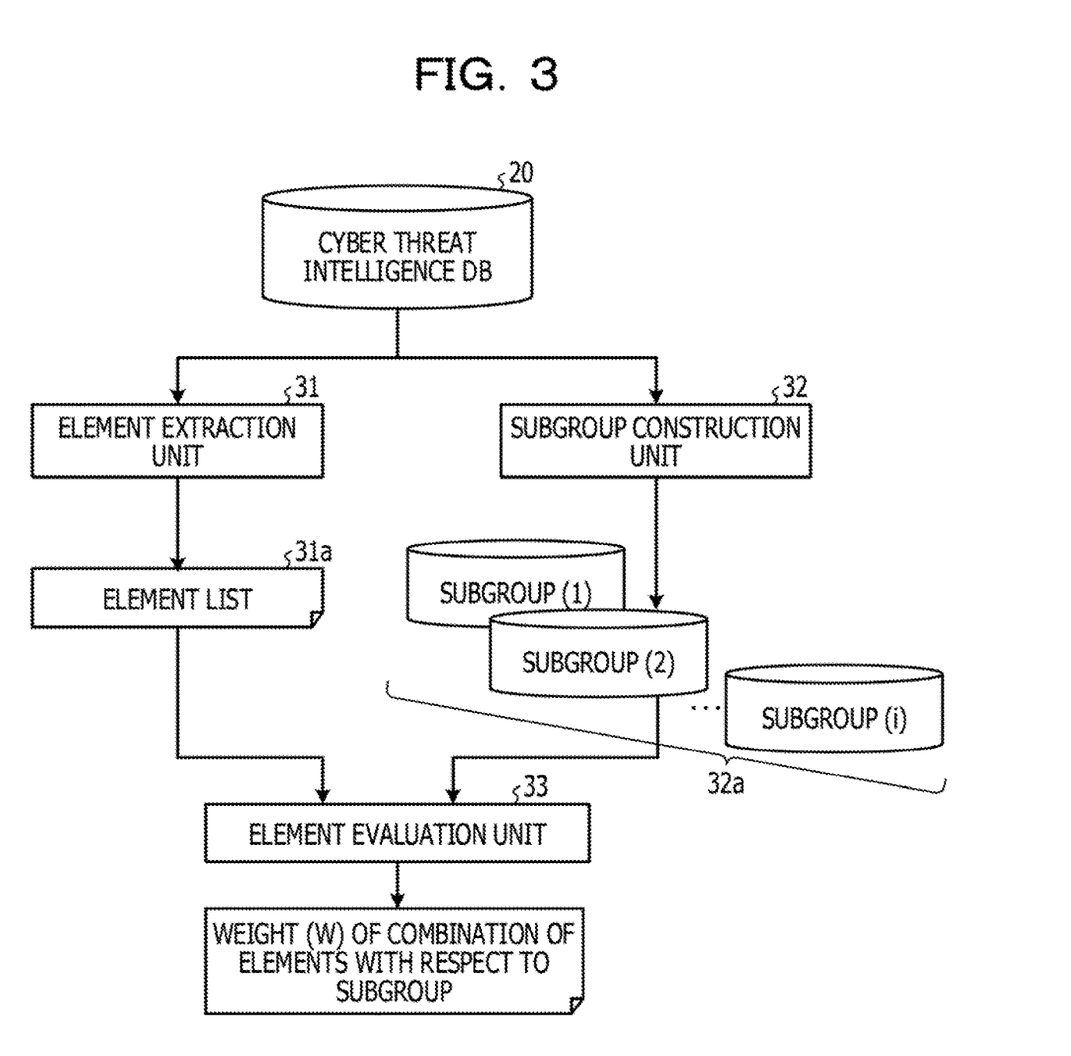
FIG. 3 is an explanatory diagram for explaining weighting of a combination of elements of the cyber threat intelligence.

Here, the details of the evaluation unit 30 will be described. FIG. 3 is an explanatory diagram for explaining weighting of a combination of elements of the cyber threat intelligence.

The element extraction unit 31 receives a list of elements to be extracted from the input unit 40. Then, as illustrated in FIG. 3, the element extraction unit 31 searches the cyber threat intelligence DB 20 for the element to be extracted included in the input list and extracts the element. Next, the element extraction unit 31 outputs an element list 31a indicating an item of the element extracted from the cyber threat intelligence DB 20 to the element evaluation unit 33. With this operation, the element extraction unit 31 extracts each element indicating the feature of the cyberattack such as the observable (IP, domain, hash value, and the like), the TTP, and the like of the cyberattack included in the input list and outputs the element list 31a to the element evaluation unit 33.

Figure 4:
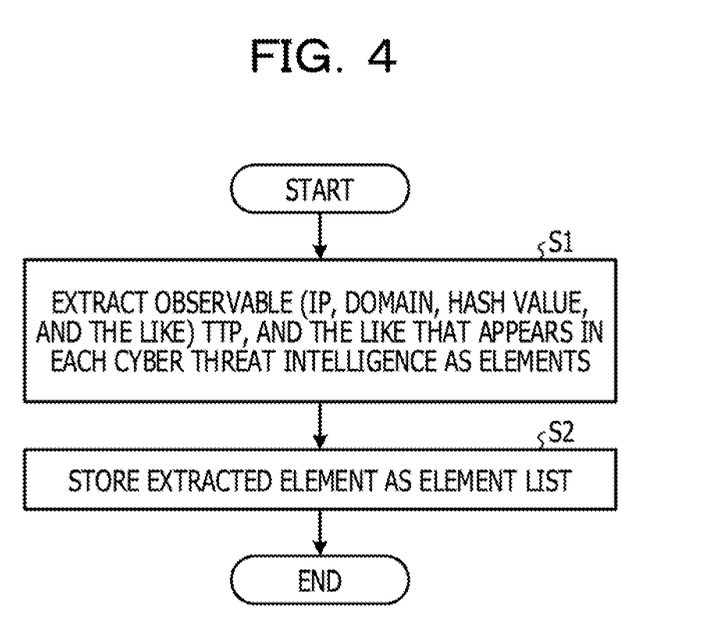
FIG. 4 is a flowchart exemplifying element extraction processing.

FIG. 4 is a flowchart exemplifying element extraction processing. As illustrated in FIG. 4, when the extraction processing is started, the element extraction unit 31 extracts the observable (IP, domain, hash value, and the like), the TTP, and the like that appears in each cyber threat intelligence 11 stored in the cyber threat intelligence DB 20 as an element (S1). Next, the element extraction unit 31 stores the extracted element as the element list 31a (S2) and outputs the element list 31a to the element evaluation unit 33.

For example, when extracting the element, in a case where the cyber threat intelligence 11 is structured according to a standard such as STIX as in FIG. 2, the element extraction unit 31 extracts the element to be extracted included in the input list after parsing the cyber threat intelligence 11 by using an XML parser and the like.

Figure 5:
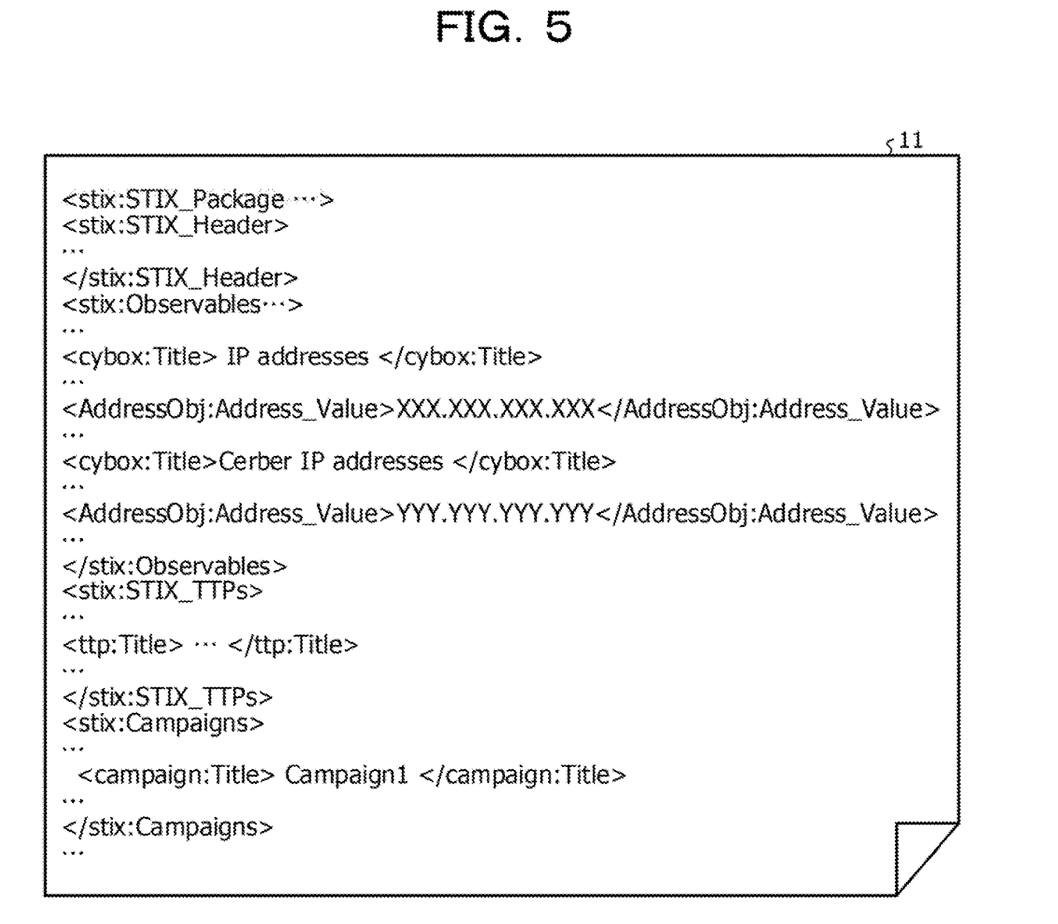
FIG. 5 is an explanatory diagram for explaining an element extraction example.

FIG. 5 is an explanatory diagram for explaining an element extraction example. It is assumed that, in the input list, an IP address of the observable be described as an element to be extracted.

As illustrated in FIG. 5, in a case of the cyber threat intelligence 11 in the STIX format, the element extraction unit 31 parses the content of the cyber threat intelligence 11 described in the XML format by the parser. With this operation, the element extraction unit 31 extracts IP address values such as "XXX.XXX.XXX.XXX", "YYY.YYY.YYY.YYY", and the like from a portion sandwiched by tags "AddressObj:Address_Value". Next, the element extraction unit 31 lists the extracted IP address values so as not to overlap with each other and describes the values in the element list 31a.

Furthermore, the element extraction unit 31 extracts the Domain and the hash value of the malware such as MD5, SHA1, and SHA256 similarly to the IP address value and stores the extracted values in the element list 31a.

In a case where the cyber threat intelligence 11 is not structured according to the standard and the like and described in a text report format, the element extraction unit 31 extracts the element to be extracted by using an existing natural language processing tool. Next, the element extraction unit 31 stores the extracted element in the element list 31a.

Returning to FIG. 3, the subgroup construction unit 32 receives a list of groups constructed as a subgroup indicating the type of the cyberattack such as the campaign, the malware, and the like from the input unit 40. Next, as illustrated in FIG. 3, the subgroup construction unit 32 refers to the cyber threat intelligence DB 20 and constructs the subgroup included in the received list corresponding to the cyber threat intelligence 11 stored in the cyber threat intelligence DB 20. Next, the subgroup construction unit 32 outputs constructed subgroups 32a (subgroup (1), subgroup (2), . . . subgroup (i)) to the element evaluation unit 33.

Figure 6:
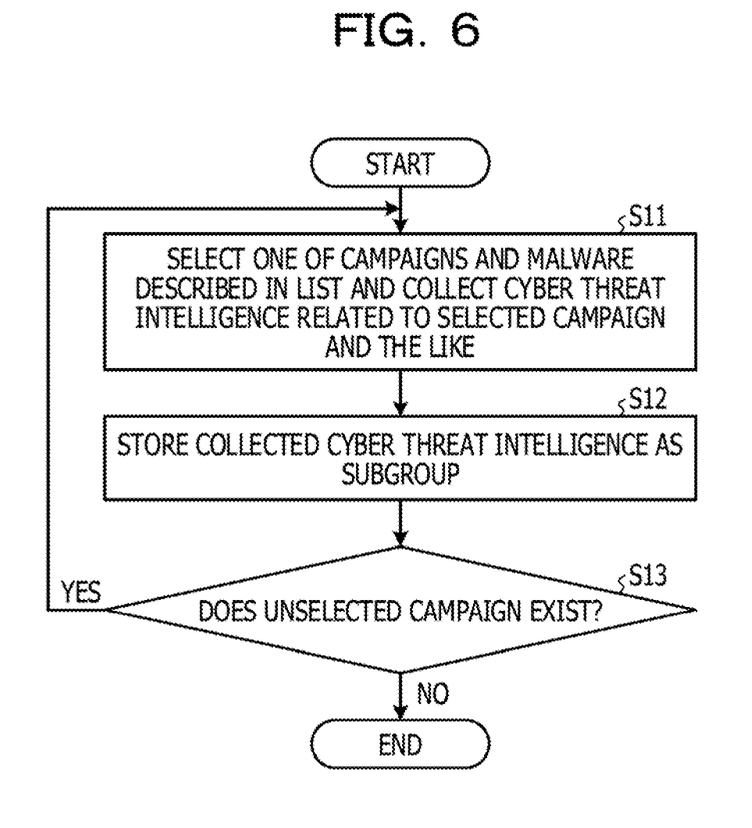
FIG. 6 is a flowchart exemplifying subgroup construction processing.

FIG. 6 is a flowchart exemplifying subgroup construction processing. As illustrated in FIG. 6, when the construction processing is started, the subgroup construction unit 32 selects one of the campaign or the malware described in the list of the subgroups to be constructed. Next, the subgroup construction unit 32 refers to the cyber threat intelligence DB 20 and collects the cyber threat intelligence 11 related to the selected campaign and the like (S11).

For example, it is assumed that "Campaign1" be selected from the list. In this case, the subgroup construction unit 32 refers to the cyber threat intelligence DB 20 and collects the cyber threat intelligence 11 in which "Campaign1" is described in a portion sandwiched by tags "campaign:Title" as illustrated in FIG. 5 as a cyber threat intelligence 11 that meets the conditions.

Next, the subgroup construction unit 32 stores the collected cyber threat intelligence 11 as the subgroup 32a (S12) and determines whether or not an unselected campaign and the like exist in the list of the subgroups to be constructed (S13). In a case where the unselected campaign and the like exist (S13: YES), the subgroup construction unit 32 returns the processing to S11. In a case where the unselected campaign and the like do not exist (S13: NO), the subgroup construction unit 32 outputs the subgroup 32a to the element evaluation unit 33 and terminates the processing.

Returning to FIG. 3, the element evaluation unit 33 receives the element list 31a output from the element extraction unit 31 and the subgroup 32a output from the subgroup construction unit 32 and evaluates and outputs the weight (W) of the combination of the elements with respect to the subgroup.

Figure 7:
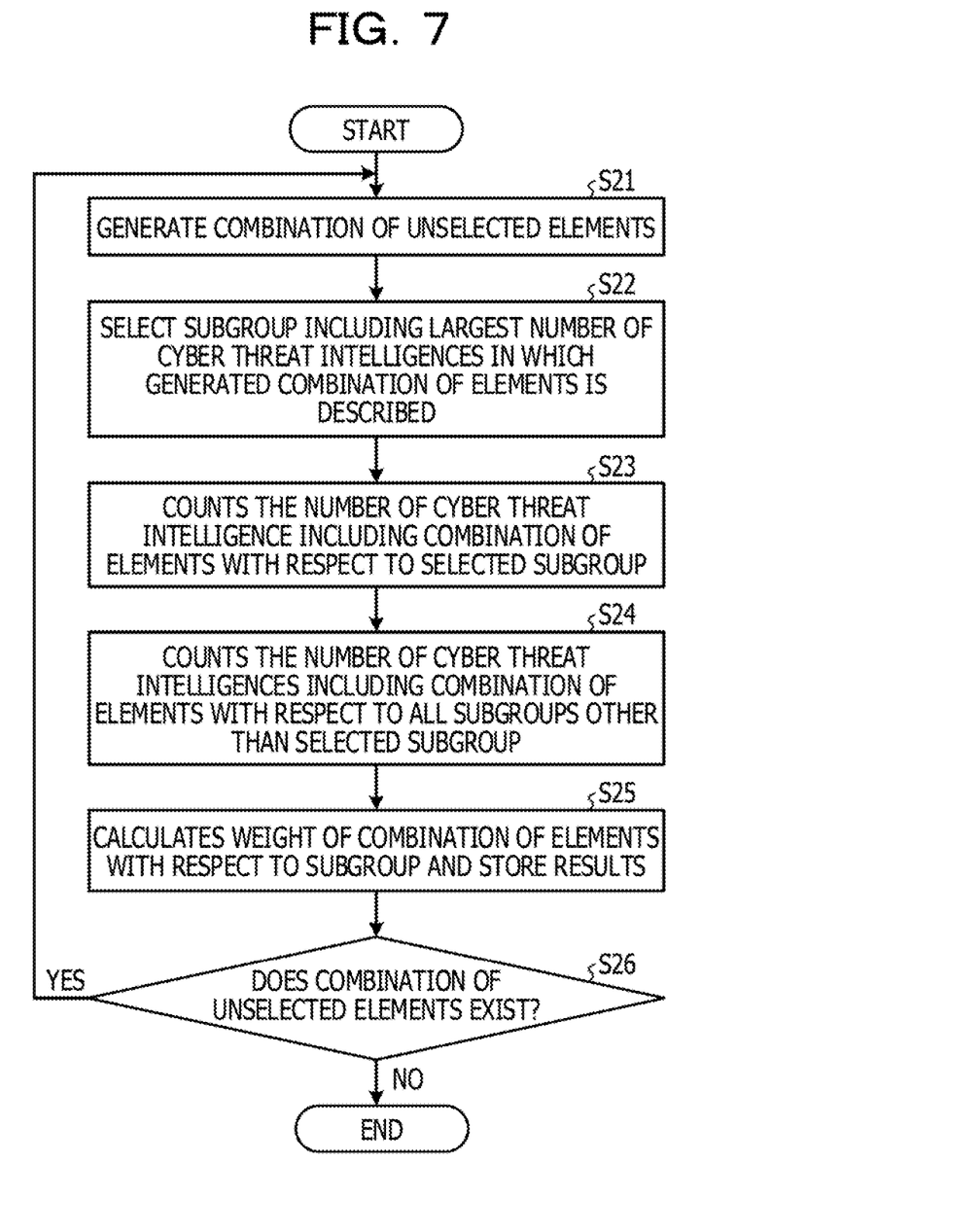
FIG. 7 is a flowchart exemplifying element evaluation processing.

FIG. 7 is a flowchart exemplifying element evaluation processing. As illustrated in FIG. 7, when the evaluation processing is started, the element evaluation unit 33 generates a combination of unselected elements from among the elements included in the element list 31a (S21). The combination of the elements here may be, for example, a single IP or a combination of a plurality of IPs.

Next, regarding the combination of the elements generated in S21, the element evaluation unit 33 selects a subgroup 32a including the largest number of cyber threat intelligences 11 in which the combination of the elements is described (S22). For example, the element evaluation unit 33 extracts a value of a tag corresponding to the combination of the elements by using the parser and the like and executes matching processing in the cyber threat intelligence 11 in the STIX format. With this operation, the element evaluation unit 33 can check, for example, whether or not the combination of the IPs is included in the cyber threat intelligence 11. Next, the element evaluation unit 33 selects the subgroup 32a having the largest number of cyber threat intelligences 11 including the combination of the elements.

Next, the element evaluation unit 33 counts the number (N) of the cyber threat intelligences 11 including the combination of the elements with respect to the subgroup selected in S22 (S23). Next, the element evaluation unit 33 counts the number (M) of the cyber threat intelligences 11 including the combination of the elements with respect to all the subgroups other than the selected subgroup (S24).

Next, the element evaluation unit 33 calculates a weight (W) of the combination of the elements with respect to the subgroup by using the values (N and M) counted in S23 and S24 and stores the calculation results in a memory and the like as output data (S25).

Specifically, the element evaluation unit 33 evaluates (calculate) the weight (W) of the combination of the elements with respect to the subgroup as the following formula (1).

$$\text{Weight } (W)=N/(N+M) \quad \text{Formula (1)}$$

In this formula (1), the observable (combination of elements) observed (appeared) in the limited subgroups has a weight closer to one. Furthermore, as the observable appears in various subgroups and the value M increases, the weight (W) is separated from one and is decreased.

Next, the element evaluation unit 33 determines whether or not the combination of the unselected elements exists among the elements included in the element list 31a (S26). In a case where the combination exists (S26: YES), the element evaluation unit 33 returns the processing to S21. In a case where the combination does not exist (S26: NO), the element evaluation unit 33 terminates the processing.

Figure 8:
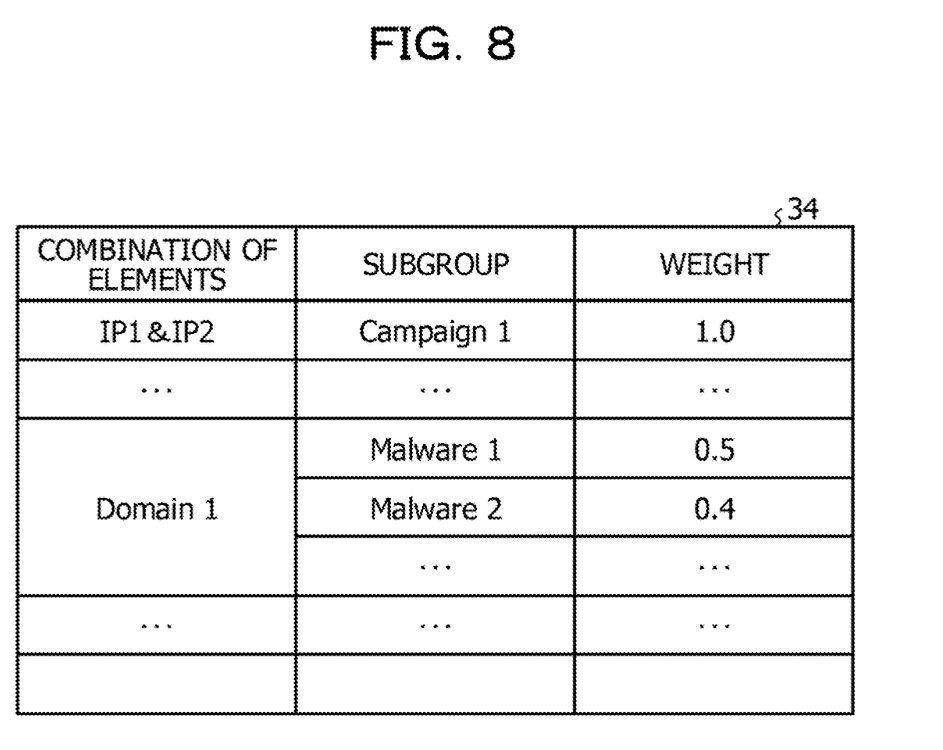
FIG. 8 is an explanatory diagram for explaining weight information of a combination of elements with respect to the subgroup.

FIG. 8 is an explanatory diagram for explaining weight information of the combination of the elements with respect to the subgroup. By executing the evaluation processing by the element evaluation unit 33, output data 34, in which the weight (W) of the combination of the elements with respect to the subgroup is calculated for each subgroup, as illustrated in FIG. 8 is stored in a memory and the like and is transmitted to the output unit 50.

Returning to FIG. 1, the input unit 40 receives a file input and an operation input by a keyboard and the like from a user. Specifically, the input unit 40 receives inputs of an item list of the element extracted by the element extraction unit 31 and a list of the subgroups such as the campaign, the malware, and the like constructed by the subgroup construction unit 32. The input unit 40 outputs the input item list of the element to the element extraction unit 31. Furthermore, the input unit 40 outputs the input list of the subgroups to the subgroup construction unit 32.

The output unit 50 outputs the evaluation results output by the evaluation unit 30, that is, the output data 34 in which the weight (W) of the combination of the elements with respect to the subgroup is calculated to a file, a display, and the like. For example, the output unit 50 displays a display screen of the evaluation results output by the evaluation unit 30 on a display and the like. With this display, the user can confirm the content of the evaluation results.

Figure 9:
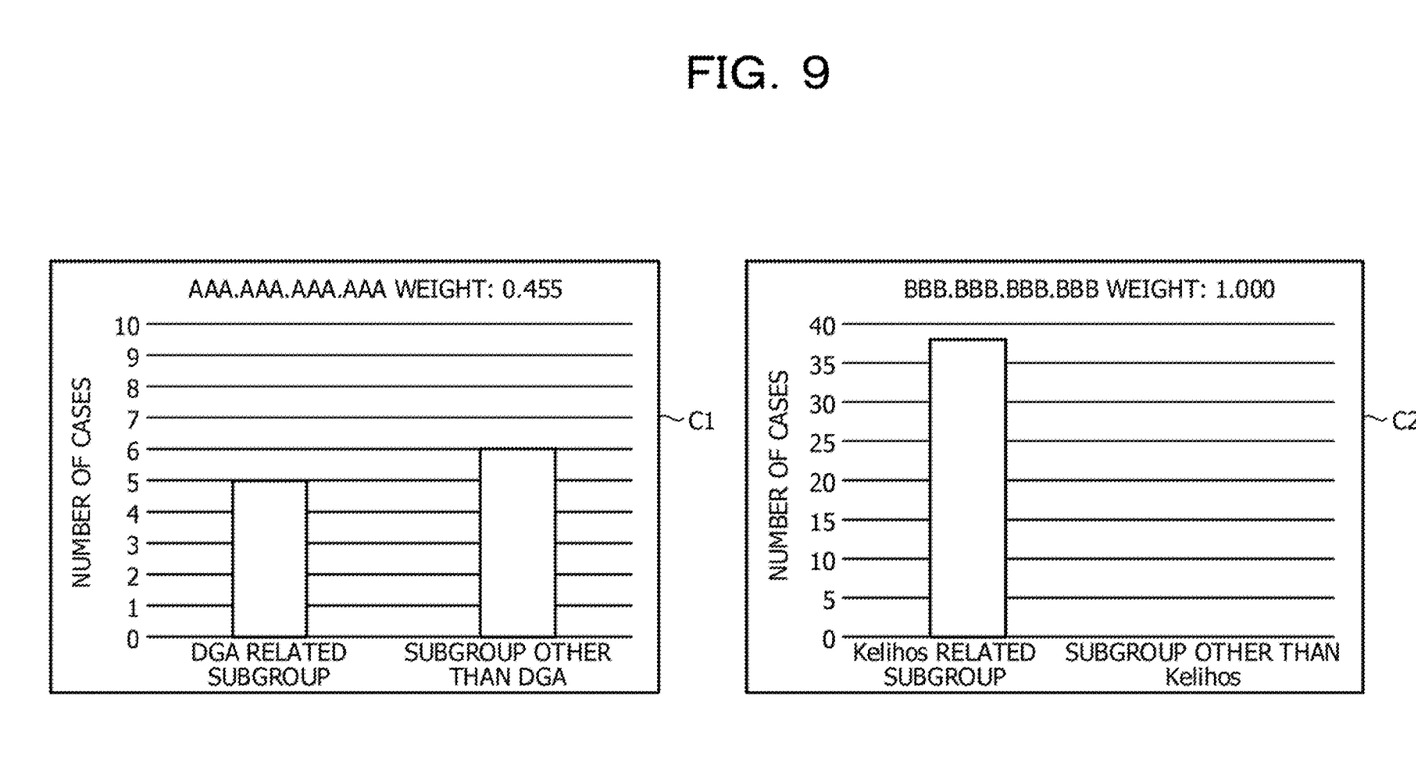
FIG. 9 is an explanatory diagram for explaining a weight calculation example.

FIG. 9 is an explanatory diagram for explaining a weight calculation example. As illustrated in FIG. 9, in a case C1, five cyber threat intelligences 11 in which an IP of "AAA.AAA.AAA.AAA" is described related to Domain Generation Algorithm (DGA) are counted, and six cyber threat intelligences 11 in no relation to the DGA are counted. In this case, the weight (W) is indicated as 5/(5+6)=0.455 according to the formula (1).

Furthermore, in a case C2, 38 cyber threat intelligences 11 related to Kelihos in which the IP of "BBB.BBB.BBB.BBB" are counted, and no cyber threat intelligence 11 other than Kelihos is counted. In this case, the weight (W) is indicated as 38/(38+0)=1.000 according to the formula (1).

In this way, in the present embodiment, the weight of the observable observed in the limited subgroups is closer to one, and the weight of the observable appeared in various subgroups is separated from one and is decreased. Therefore, by confirming the weight value, the user can distinguish whether or not an event observed in the cyberattack is an observable that is used by a commonly used method.

(Modification)

The weighting method is not limited to the above method, and an index such as TF-IDF may be used. However, in the cyber threat intelligence 11 (especially when structured by STIX format and the like), each element does not often repeatedly appear in the same document as a significant keyword in the document. For example, a single element is registered for a single cyber threat intelligence 11. Therefore, there is a case where a weight of an element of which a frequency is low and is not evaluated as a high value with the index such as TF-IDF can be evaluated to be high by the above method.

Figure 10:
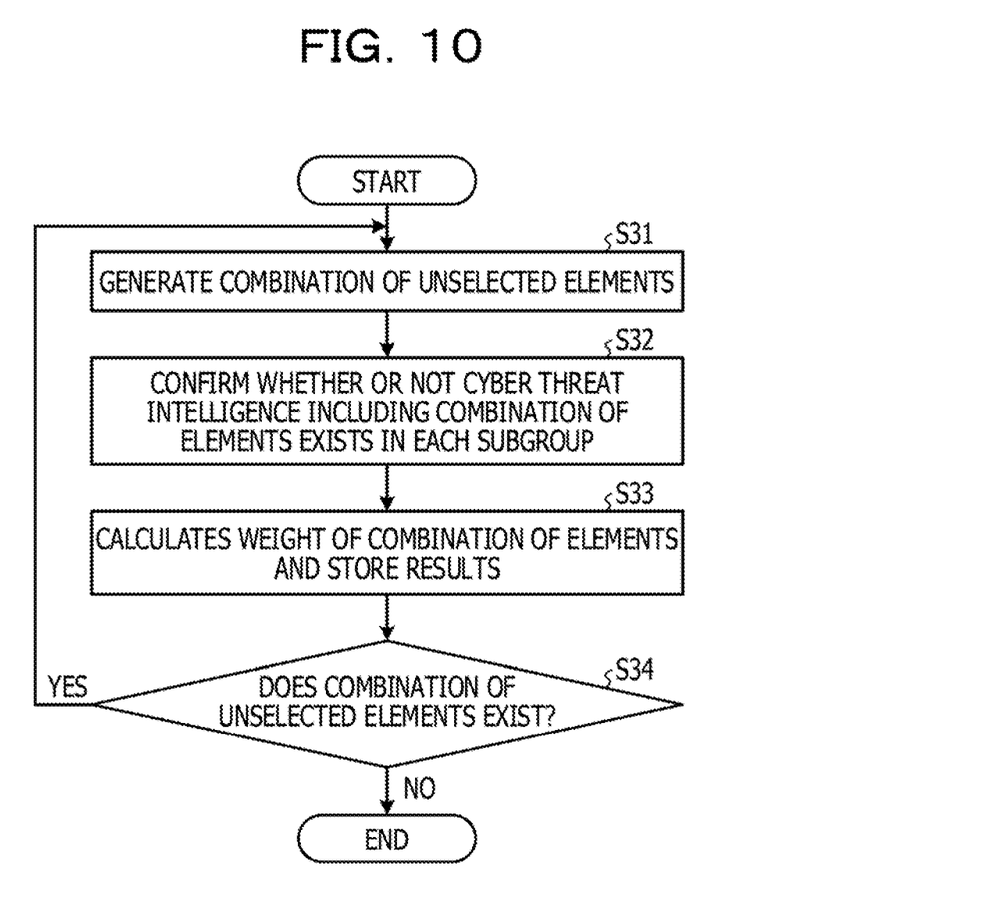
FIG. 10 is a flowchart illustrating a modification of the element evaluation processing.

A modification of the element evaluation processing based on the above viewpoints will be described. FIG. 10 is a flowchart illustrating a modification of the element evaluation processing.

As illustrated in FIG. 10, when the evaluation processing is started, the element evaluation unit 33 generates a combination of unselected elements from among the elements included in the element list 31*a* (S31). Next, the element evaluation unit 33 confirms whether or not a cyber threat intelligence 11 including the combination of the elements exists in each subgroup 32*a* (S32).

Next, the element evaluation unit 33 calculates a weight of the combination of the elements based on the number of subgroups (S) including the combination of the elements and stores the calculation results in the memory and the like as the output data 34 (S33).

Specifically, the element evaluation unit 33 evaluates (calculate) the weight (W) as the following formula (2).

$$\text{Weight } (W) = 1/S \quad \text{Formula (2)}$$

Next, the element evaluation unit 33 determines whether or not the combination of the unselected elements exists among the elements included in the element list 31*a* (S34). In a case where the combination exists (S34: YES), the element evaluation unit 33 returns the processing to S31. In a case where the combination does not exist (S34: NO), the element evaluation unit 33 terminates the processing.

Figure 11:
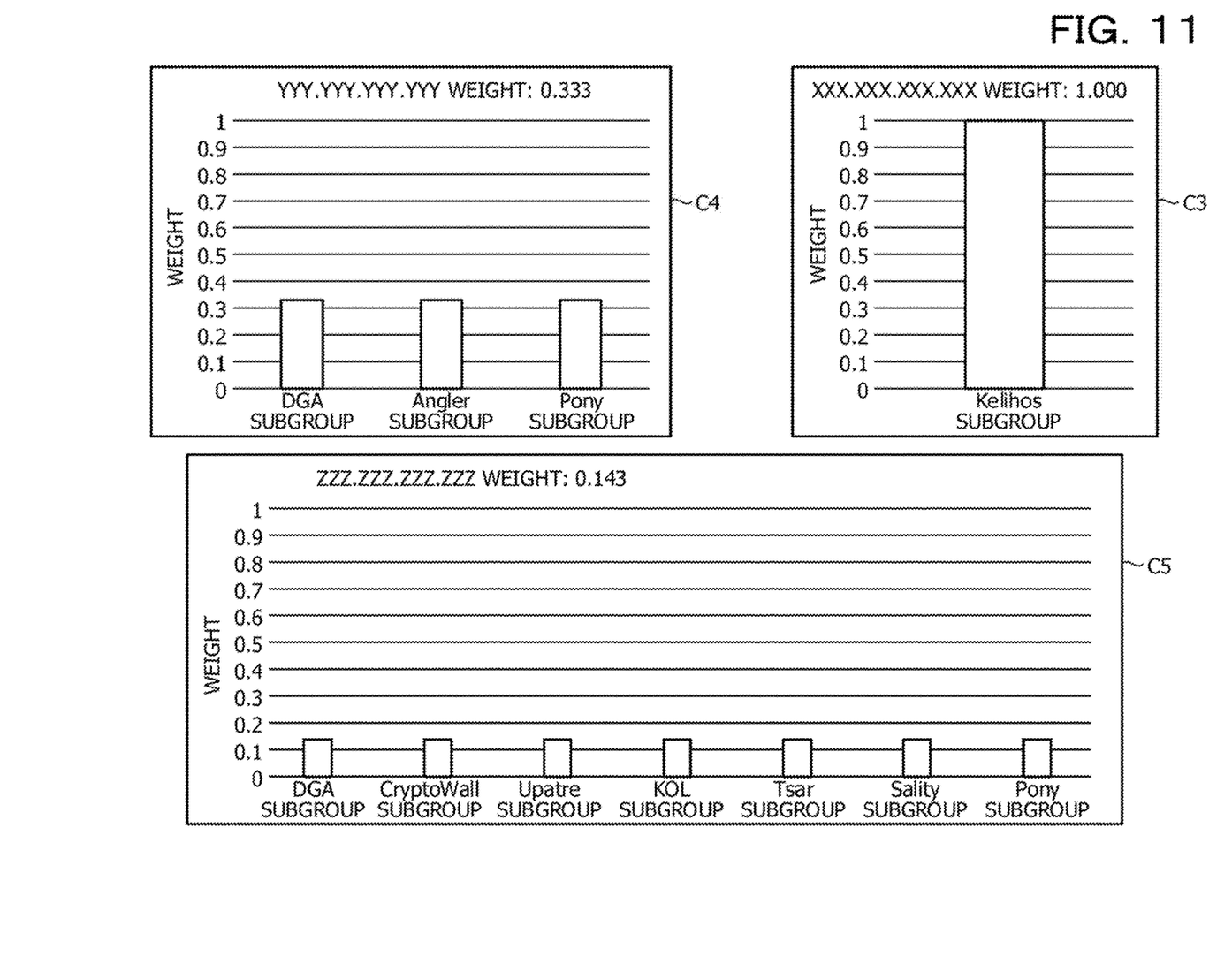
FIG. 11 is an explanatory diagram for explaining a weight calculation example.

FIG. 11 is an explanatory diagram for explaining a weight calculation example. As illustrated in FIG. 11, for example, an IP "XXX.XXX.XXX.XXX" in a case C3 is included in a subgroup of "Kelihos" and is not included in other subgroups. Therefore, a weight of the IP "XXX.XXX.XXX.XXX" is 1.000.

On the other hand, since an IP "YYY.YYY.YYY.YYY" in a case C4 is included in three types of subgroups, a weight is evaluated as ⅓=0.333. Furthermore, as an IP "ZZZ.ZZZ.ZZZ.ZZZ" in a case C5, an element included in more subgroups has a lower weight. Therefore, by confirming the weight value calculated in the modification, the user can recognize the number of types of cyberattacks in which the feature information (element) of the cyberattack is observed.

As described above, the cyber threat intelligence collection unit 10 of the information processing apparatus 1 collects the cyber threat intelligence 11 through the Internet and the like and stores the cyber threat intelligence 11 in the cyber threat intelligence DB 20. The evaluation unit 30 of the information processing apparatus 1 refers to the cyber threat intelligence DB 20 and evaluates the number of types of the cyberattacks in which the feature information of the cyberattack appears regarding the feature information of the cyberattack. Furthermore, when receiving the specification of the feature information of the cyberattack by the input unit 40, the evaluation unit 30 responds the evaluation results regarding the number of types of the cyberattacks in which the feature information of the cyberattack appears. The output unit 50 of the information processing apparatus 1 outputs the evaluation results responded by the evaluation unit 30 to a file, a display, and the like.

With this operation, for example, the user can distinguish whether or not an event observed in the cyberattack is an observable that is used by a commonly used method, and can easily analyze the cyberattack.

Furthermore, at the time of response of the evaluation results, the information processing apparatus 1 also responds the type of the cyberattack in which the specified feature information of the cyberattack appears. For example, in the example in FIG. 9, IPs indicating the feature of the cyberattack such as "AAA.AAA.AAA.AAA" and "BBB.BBB.BBB.BBB" are output together with the subgroup corresponding to the type of the cyberattack such as "DGA related" and "Kelihos related". With this operation, the user can easily confirm a relationship between the feature information of the cyberattack and the type of the cyberattack in which the feature information appears.

Furthermore, the information processing apparatus 1 responds a weight value indicating a degree of appearance of the specified feature information of the cyberattack for each type of the cyberattack. For example, in the case C4 in FIG. 11, for each subgroup corresponding to the type of the cyberattack such as "DGA", "Angler", "Pony", and the like, a weight indicating an appearance degree of the IP such as "YYY.YYY.YYY.YYY" indicating the feature of the cyberattack is output. With this operation, the user can easily confirm the degree of the appearance of the feature information of the cyberattack for each type of the cyberattack.

Note that the respective components of the illustrated apparatus and devices are not necessarily physically configured as illustrated in the drawings. That is, the specific aspects of separation and integration of each of the apparatus and devices are not limited to the illustrated aspects, and all or part of the apparatus or devices can be functionally or physically separated and integrated in any unit, in accordance with various loads and use status.

In addition, various processing functions executed with the information processing apparatus 1 may be entirely or optionally partially executed on a central processing unit (CPU) (or microcomputer such as microprocessor unit (MPU) or micro controller unit (MCU)). Furthermore, it is needless to say that whole or any part of various processing functions may be executed by a program to be analyzed and executed on a CPU (or microcomputer such as MPU or MCU), or on hardware by wired logic. Furthermore, various processing functions executed with the information processing apparatus 1 may be executed by a plurality of computers in cooperation though cloud computing.

Figure 12:
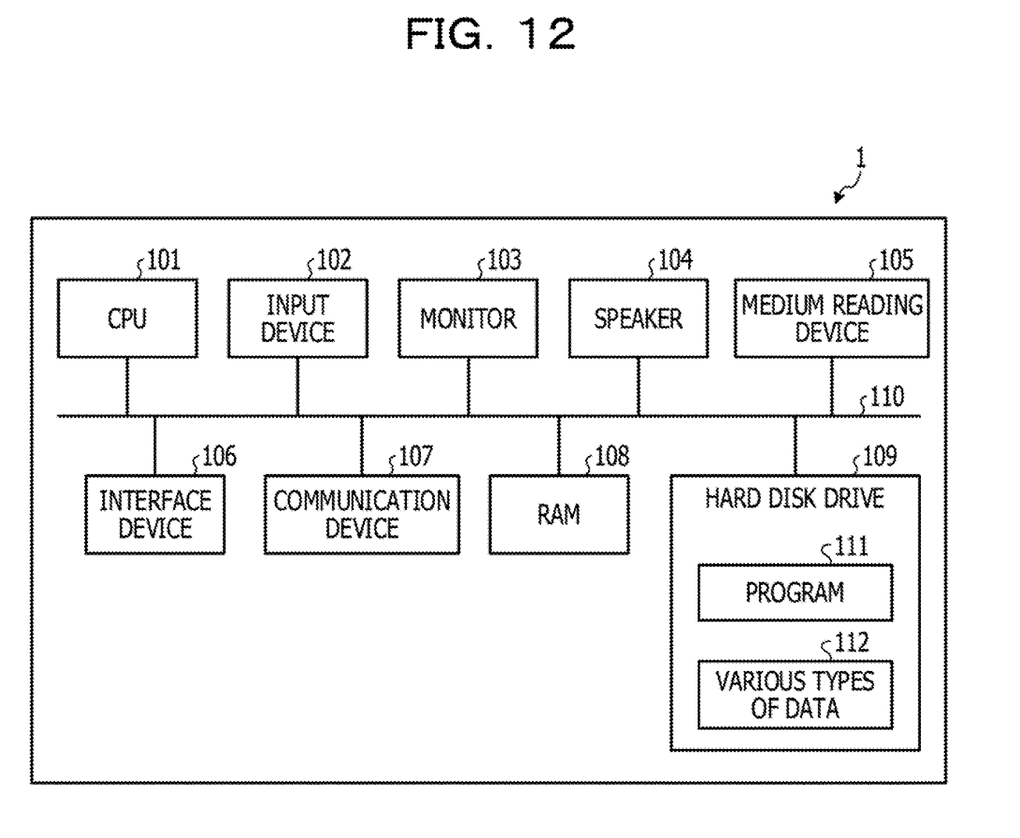
FIG. 12 is a block diagram illustrating an exemplary hardware configuration of the information processing apparatus according to the embodiment.

Meanwhile, the various processing described in the above embodiment can be achieved by executing a prepared program on a computer. Thus, there will be described below an example of a computer (hardware) that executes a program with functions similar to the functions in the above embodiment. FIG. 12 is a block diagram illustrating an exemplary hardware configuration of the information processing apparatus 1 according to the embodiment.

As illustrated in FIG. 12, the information processing apparatus 1 includes a CPU 101 that executes various types of arithmetic processing, an input device 102 that receives data input, a monitor 103, and a speaker 104. In addition, the information processing apparatus 1 includes a medium reading device 105 that reads a program and the like from a storage medium, an interface device 106 that is used for connecting to various devices, and a communication device 107 that makes communicative connection with an external device in a wired or wireless manner. Furthermore, the information processing apparatus 1 further includes a RAM 108 for temporarily storing various types of information, and a hard disk drive 109. Furthermore, each unit (101 to 109) in the information processing apparatus 1 is connected to a bus 110.

The hard disk drive 109 stores a program 111 that executes various types of processing described in the above embodiment. In addition, the hard disk drive 109 stores various types of data 112 to which the program 111 refers. The input device 102 receives, for example, an input of operation information from an operator. The monitor 103 displays, for example, various screens operated by the operator. The interface device 106 is connected to, for example, a printing device. The communication device 107 is connected to a communication network such as a local area network (LAN) and the like, and exchanges various types of information with the external device via a communication network.

The CPU 101 reads the program 111 stored in the hard disk drive 109 and loads the program 111 into the RAM 108 to execute the program 111. Then, the CPU 101 executes the various types of processing. Note that, it is not necessary for the program 111 to be stored in the hard disk drive 109. For example, the program 111 that is stored in a storage medium and can be read by the information processing apparatus 1 may be read and executed. The storage medium which can be read by the information processing apparatus 1 corresponds to, for example, a portable recording medium such as a CD-ROM, a DVD disk, and an universal serial bus (USB) memory, a semiconductor memory such as a flash memory, a hard disk drive, and the like. Alternatively, the program 111 may be prestored in a device connected to a public line, the Internet, a LAN, or the like, and the information processing apparatus 1 may read the program 111 from the device to execute the program 111.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a program that cause a processor included in an information processing apparatus to execute a process, the process comprising:
   collecting a plurality of cyberattack information related to cyberattacks;
   classifying the plurality of cyberattack information into a plurality of groups based on types of the cyberattacks;
   evaluating, for each of a plurality of feature information of the cyberattacks, a degree of a number of types of cyberattacks in which the feature information appears based on the plurality of groups; and
   when receiving specification of the feature information of a cyberattack, responding evaluation results of the degree of the number of types of the cyberattacks in which the specified feature information of the cyberattack appears.

2. The storage medium according to claim 1, wherein the responding includes responding a type of the cyberattack in which the specified feature information of the cyberattack appears.

3. The storage medium according to claim 1, wherein the responding includes responding a weight value indicating a degree of appearance of the specified feature information of the cyberattack for each of the types of the cyberattacks.

4. The storage medium according to claim 1, wherein the responding includes responding evaluation results of the number of types of the cyberattacks in which the specified combination of the feature information of the cyberattack appears when specification of a combination of the feature information of the cyberattack is received.

5. The storage medium according to claim 1, wherein the collecting includes collecting various cyber threat intelligences as the feature information by crawling preset sites on Internet.

6. The storage medium according to claim 1, wherein the process comprising
   extracting elements indicating features of the cyberattacks from the plurality of cyberattack information as the feature information.

7. An evaluation method executed by a processor included in an information processing apparatus, the evaluation method comprising:
   collecting a plurality of cyberattack information related to cyberattacks;
   classifying the plurality of cyberattack information into a plurality of groups based on types of the cyberattacks;
   evaluating, for each of a plurality of feature information of the cyberattacks, a degree of a number of types of cyberattacks in which the feature information appears based on the plurality of groups; and when receiving specification of the feature information of a cyberattack, responding evaluation results of the degree of the number of types of the cyberattacks in which the specified feature information of the cyberattack appears.

8. The evaluation method according to claim 7, wherein the responding includes responding a type of the cyberattack in which the specified feature information of the cyberattack appears.

9. The evaluation method according to claim 7, wherein the responding includes responding a weight value indicating a degree of appearance of the specified feature information of the cyberattack for each of the types of the cyberattacks.

10. The evaluation method according to claim 7, wherein the responding includes responding evaluation results of the number of types of the cyberattacks in which the specified combination of the feature information of the cyberattack appears when specification of a combination of the feature information of the cyberattack is received.

11. An information processing apparatus comprising:
a memory; and
a processor coupled to the memory and configured to:
    collect a plurality of cyberattack information related to cyberattacks;
    classify the plurality of cyberattack information into a plurality of groups based on types of the cyberattacks;
    evaluate, for each of a plurality of feature information of the cyberattacks, a degree of a number of types of cyberattacks in which the feature information appears based on the plurality of groups; and
    when receiving specification of the feature information of a cyberattack, respond evaluation results of the degree of the number of types of the cyberattacks in which the specified feature information of the cyberattack appears.

12. The information processing apparatus according to claim 11, wherein the processor is configured to
    respond a type of the cyberattack in which the specified feature information of the cyberattack appears.

13. The information processing apparatus according to claim 11, wherein the processor is configured to
    respond a weight value indicating a degree of appearance of the specified feature information of the cyberattack for each of the types of the cyberattacks.

14. The information processing apparatus according to claim 11, wherein the processor is configured to
    respond evaluation results of the number of types of the cyberattacks in which the specified combination of the feature information of the cyberattack appears when specification of a combination of the feature information of the cyberattack is received.

* * * * *